United States Patent [19]

Averbuch et al.

[11] Patent Number: 5,689,825
[45] Date of Patent: Nov. 18, 1997

[54] METHOD AND APPARATUS FOR DOWNLOADING UPDATED SOFTWARE TO PORTABLE WIRELESS COMMUNICATION UNITS

[75] Inventors: Ziva Averbuch; Rod Averbuch, both of Buffalo Grove, Ill.

[73] Assignee: Motorola, Inc., Schaumburg, Ill.

[21] Appl. No.: 508,658

[22] Filed: Jul. 28, 1995

[51] Int. Cl.$^6$ .................................................. H04Q 7/00
[52] U.S. Cl. ............................ 455/89; 455/66; 455/344; 340/825.22; 379/93; 379/58
[58] Field of Search ....................... 455/38.1, 38.2, 455/66, 68, 69, 70, 88, 89, 344, 346, 347, 352, 353, 127; 340/825.22, 825.44, 825.54; 320/2; 379/58, 61, 63, 93, 98, 96

[56] References Cited

U.S. PATENT DOCUMENTS

| | | | |
|---|---|---|---|
| 4,771,399 | 9/1988 | Snowden et al. | 340/825.44 X |
| 5,109,403 | 4/1992 | Sutphin | 379/63 X |
| 5,488,356 | 1/1996 | Martinovich et al. | 340/825.22 |
| 5,511,240 | 4/1996 | Nishiyama | 455/127 |

Primary Examiner—Reinhard J. Eisenzopf
Assistant Examiner—Philip J. Sobutka
Attorney, Agent, or Firm—Christopher P. Moreno

[57] ABSTRACT

A portable wireless communication unit (101) is coupled to battery charger/software downloader (108) via a unit interface (304). Upon detecting a flag (402) in the portable wireless communication unit, a software downloader that includes a processing unit (300) connected to a land-based public communication network interface (302) and a memory (306), receives updated software from a server (104) and downloads the updated software to the portable Wireless communication unit via the unit interface.

15 Claims, 2 Drawing Sheets

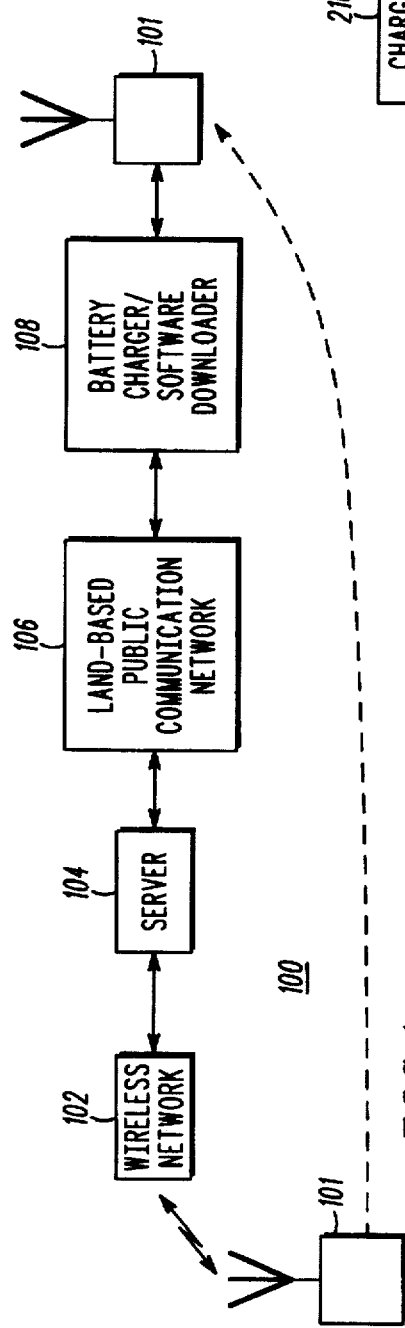
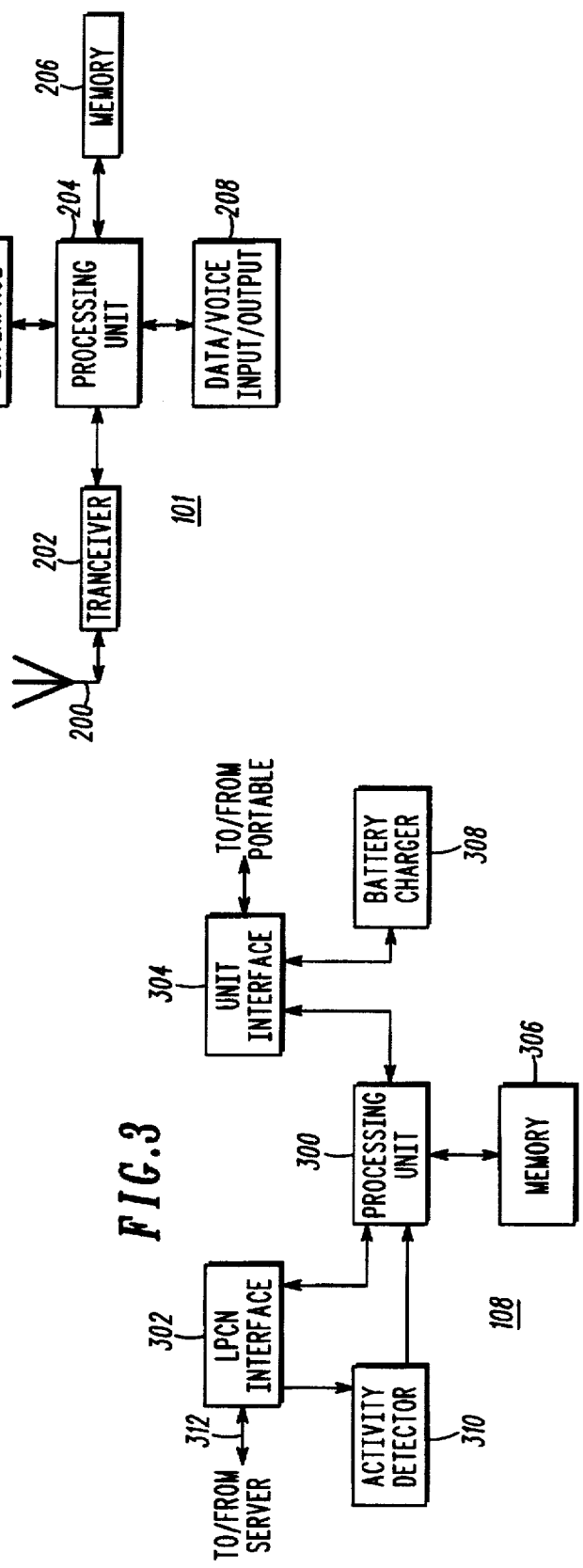
FIG.1
FIG.2
FIG.3

METHOD AND APPARATUS FOR DOWNLOADING UPDATED SOFTWARE TO PORTABLE WIRELESS COMMUNICATION UNITS

FIELD OF THE INVENTION

The present invention relates generally to wireless communication systems and, in particular, to a method and apparatus for downloading updated software to portable wireless communication units.

BACKGROUND OF THE INVENTION

Wireless communication systems are known to comprise wireless communication units, such as in-car mobile and/or hand-held portable radios, that communicate with each other and a fixed infrastructure using wireless communication resources. Many of the user features provided by such wireless communication units are often based on software programs stored and executed within the wireless communication units. That is, algorithms electronically stored in memories are executed by processing devices, such as microprocessors, to realize certain features.

As existing features are improved and new features are developed for wireless communication-units, new versions of software become available with increasing frequency. Users of wireless communication units typically desire to receive the newest versions of updated software as quickly and as efficiently as possible in order to take advantage of the improvements.

Prior art approaches for delivering updated software to wireless communication units are not always convenient and/or efficient. One method requires a user to bring the wireless communication unit to a central location, such as a service shop operated by a system administrator or service provider. The unit is then either provided with replacement parts containing the updated software (i.e., replacement memory devices) or physically connected to a device that transfers the updated software to the unit. Regardless of how the updated software is actually transferred, this method is both time-consuming and inconvenient to users since they are typically required to bring their unit in for service during normal work hours.

Another method is used to overcome the difficulties presented by the previous method. To this end, the wireless communication units are capable of receiving the updated software wirelessly as a special type of data message. This eliminates the need to physically alter the unit or to co-locate the unit with a reprogramming device. However, updated software versions often comprise many megabytes of data; transmission of such a large amount of data can be prohibitively expensive. That is, the extensive use of wireless communication resources required to send the updated software to a large number of units, as is often the case with even a modest-sized communication system, would significantly impact the system's ability to provide regular services. Therefore, a need exists for an approach that allows updated software to be provided without the inconvenience of bringing the unit to a service shop and which does not place a prohibitively large burden on wireless communication resources.

BRIEF DESCRIPTION OF THE DRAWINGS

FIG. 1 is a block diagram of a wireless communication system.

FIG. 2 is a block diagram of the portable wireless communication unit shown in FIG. 1.

FIG. 3 is a block diagram of the battery charger/software downloader shown in FIG. 1.

DESCRIPTION OF A PREFERRED EMBODIMENT

Figure 4:
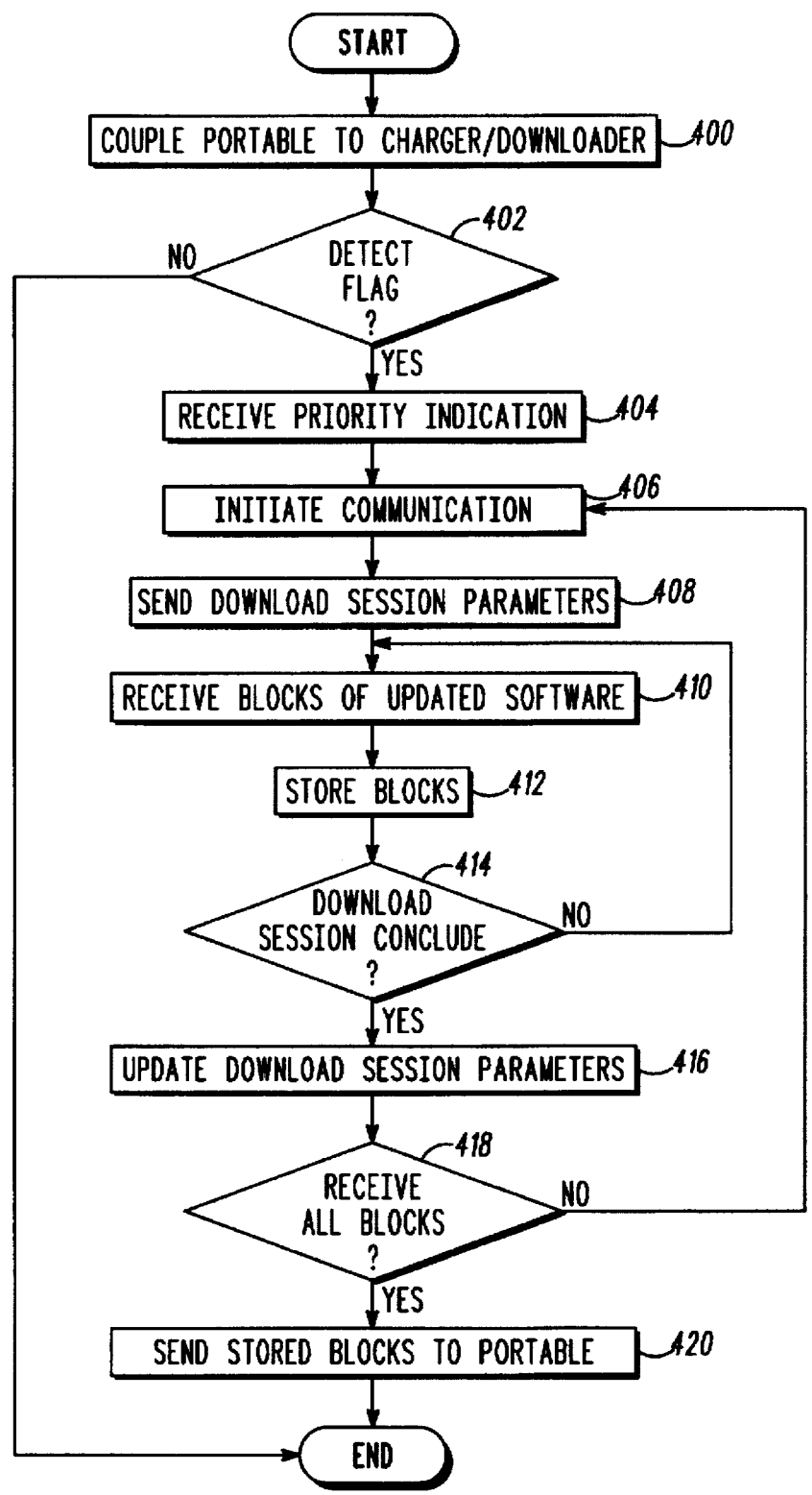
FIG. 4 is a flow chart illustrating a method for downloading updated software to a portable wireless communication unit using the battery charger/software downloader shown in FIG. 1.

The present invention provides a method and apparatus for downloading updated software to portable wireless communication units. An integrated battery charger and software downloader can be coupled to a portable wireless communication unit via a unit interface included in the battery charger/software downloader. A battery charger, connected to the unit interface, allows a battery of the portable wireless communication unit to be charged. Additionally, a software downloader, comprising a processing unit connected to a land-based public communication network interface and a memory, receives updated software from a server and downloads the updated software to a portable wireless communication unit via the unit interface.

When receiving updated software from a server, the integrated battery charger and software downloader initializes a download session using download session parameters. Blocks of the updated software are received from the server and stored in the memory. When the download session has concluded, the download session parameters are updated. When the portable wireless communication unit is coupled to the unit interface, the stored blocks are sent to the portable wireless communication unit. Using this approach, a portable wireless communication unit can receive updated software in an efficient manner, thus avoiding the need for manual re-programming or inefficient over-the-air software downloads.

The present invention can be more fully described with reference to FIGS. 1–4. FIG. 1 is a block diagram of a wireless communication system 100 comprising a plurality of portable wireless communication units 101 (only one shown), a wireless network 102, a server 104, a land-based public communication network 106, and a battery charger/software downloader 108. The portable wireless communication unit 101 may comprise any type of portable radio or radiotelephone and is described in further detail below. The dotted line shown indicates two possible states for the portable wireless communication unit 101: communicating with the wireless network 102 or with the battery charger/software downloader 108, as described below. The wireless network 102 provides wireless communication connectivity for the portable wireless communication units 101 and can be, for example, a digital cellular system using time-division multiplexed access (TDMA) or code-division multiplexed access (CDMA) protocols. Furthermore, the wireless network 102 is in communication with the server 104.

The server 104 is used to receive and store updated software for later downloading to the portable wireless communication units 101. The server 104 supports client server protocols allowing it to communicate with both the wireless network 102 and the land-based public communication network 106. The land-based public communication network 106 may comprise a public switched telephone network (PSTN) or integrated services digital network (ISDN).

The battery charger/software downloader 108 serves a dual function when coupled to the portable wireless communication unit 101: charging batteries for the portable wireless communication unit 101 and performing software downloads when necessary. In a preferred embodiment, software downloads are performed when a flag, indicating availability of updated software, is detected within a portable wireless communication unit. A method for setting such a flag is described in a co-pending U.S. patent application entitled METHOD FOR INDICATING AVAILABILITY OF UPDATED SOFTWARE TO PORTABLE WIRELESS COMMUNICATION UNITS having Ser. No. 08/508,656 and filed on the same day as the present application. The battery charger/software downloader 108 is described in further detail below.

FIG. 2 is a block diagram of the portable wireless communication unit 101 comprising an antenna 200, a transceiver 202, a processing unit 204, memory 206, a data/voice input/output device (I/O) 208, a charger/downloader interface 210, and a battery 212. The antenna 200 and transceiver 202 together allow information to be wirelessly transmitted/received and, in a preferred embodiment, are suitable for radio frequency (RF) transmission/reception.

The processing unit 204 may comprise one or more processing devices, such as microprocessors and/or digital signal processors. The processing unit 204 performs all necessary processing and formatting for the transmission and reception of digital voice and/or data signals. The voice and/or data signals are received from, and sent to, the data/voice I/O device 208 which may comprise a microphone and speaker for voice signals and an RS-232 port for data signals. Furthermore, the processing unit 204 also executes those procedures necessary to received indications of updated software availability as well as the actual downloading of updated software.

The procedures executed by the processing unit 204 are stored as software routines, often referred to as code, in the memory 206. In a preferred embodiment, the memory 206 comprises volatile and non-volatile memory. Suitable volatile memory is random-access memory (RAM) for use with temporary operating parameters and the like. Suitable non-volatile memory is electrically-erasable programmable read-only memory (EEPROM) for the storage of tables and software code, including permanent software downloading (boot) code. The non-volatile memory can also be used for storing temporary parameters having non-volatile characteristics, e.g., a flag indicating the presence of updated software.

The charger/downloader interface 210 comprises a connector and power circuitry needed to charge the portable wireless communication unit's battery 212. The battery 212 comprises a rechargeable battery that provides power to all components of the portable wireless communication unit 101. The charger/downloader interface 210 also includes a data interface (such as RS-232 port) that allows the processing unit 204 to perform downloading of updated software.

FIG. 3 is a block diagram of the battery charger/software downloader 108 comprising a processing unit 300, a land-based public communication network interface 302, a unit interface 304, memory 306, a battery charger 308, and an activity detector 310. The processing unit 300 may comprise one or more processing devices, such as microprocessors and/or digital signal processors and is used to implement the client server protocols between the battery charger/software downloader 108 and the server 104 via the land-based public communication network 106. Additionally, when communicating with the portable wireless communication unit 101 via the unit interface 304, the processing unit 300 supports the downloading of updated software, stored in the memory 306, to the portable wireless communication unit 101.

The land-based public communication network interface 302 is connected to the land-based public communication network 106 via an appropriate physical connection 312 such as twisted-pair for a PSTN or S-interface for an ISDN. However, from client server protocol perspective, the land-based public communication network interface 302 is logically connected to the server 104. The control and processing functions of the land-based public communication network interface 302 can be implemented using a separate processing device or as part of the processing unit 300.

The unit interface 304 comprises a connection device that serves two purposes. First, the unit interface 304 provides a connection between the battery charger 308 and the battery 212 of the unit. Second, the unit interface 304 provides those connections necessary to allow the processing unit 300 to download updated software stored in the memory 306 to the memory 206 of the unit. A suitable unit interface 304 is an RS-232 connector that can mate with a corresponding connector on the portable wireless communication unit 101.

The memory 306 is used for the storage of code and temporary parameters necessary for the operation of the battery charger/software downloader 108. Additionally, the memory 306 is used for storage of updated software intended for use in the portable wireless communication unit 101. Such updated software, as described below, is downloaded to the battery charger/software downloader 108 via the land-based public communication network interface 302. As before, the memory 306 may comprise a combination of volatile and non-volatile memory such as RAM and ROM.

The activity detector 310 detects activity on the physical connection 312. Forwarding detection of such activity to the processing unit 300, the activity detector 310 allows the battery charger/software downloader 108 to share the physical connection 312 with other devices, such as a conventional telephone or computer modem (not shown). Furthermore, the activity detector 310 can be used to determine a connection usage profile of the physical connection 312 in order to determine optimal times for communicating with the server 104.

Using the battery charger/software downloader 108 described above, a method for downloading updated software to the portable wireless communication unit 101 is described below.

FIG. 4 is a flow chart illustrating a method for downloading updated software to the portable wireless communication unit 101 using the battery charger/software downloader 108. At step 400, the portable wireless communication unit 101 is coupled to the battery charger/software downloader 108. For instance, when a user goes home or leaves work, the unit can be placed in a battery charger/software downloader for routine battery recharging and, as described in the following steps, for downloading of updated software as necessary.

At step 402, the battery charger/software downloader 108 determines if a flag indicating the availability of updated software is set in the portable wireless communication unit 101. The battery charger/software downloader 108 can access, either directly or in cooperation with the processing unit 204, the memory 206 of the portable wireless communication unit 101 to determine if the flag is set. A method for setting such a flag is described in a co-pending U.S. patent application Ser. No. 08/508,656 entitled METHOD FOR INDICATING AVAILABILITY OF UPDATED SOFTWARE TO PORTABLE WIRELESS COMMUNICATION UNITS. If the flag is not detected (i.e., not set), the process ends as there is no need to download updated software to the portable.

At step 404, assuming that the flag was detected, the battery charger/software downloader 108 receives a priority indication from the portable wireless communication unit 101. The priority indication is based on the presence in a given portable unit of a special service or on a relative importance level of a particular user. The priority indication is thus defined during configuration of each portable. In a preferred embodiment, the priority indication comprises a numerical value indicative of a corresponding priority level, wherein a unique value is reserved (e.g., a priority indication of 0) to indicate that the particular user is not capable of getting the automatic update service.

Using the priority indication and the connection usage profile determined by the activity detector 310, the battery charger/software downloader 108 determines the best time to contact the server 104. For example, if the connection usage profile shows that there is typically little or no activity present on the physical connection 312 after 5:00 PM, then it is best to initiate communications with the server 104 after 5:00 PM. However, if the priority indication corresponds to a sufficiently high priority level, the battery charger/software downloader 108 can use quiet periods during the day communicate for short periods with the server 104. Additionally, preference could be given to those periods of the day in which usage costs are the lowest. In short, the battery charger/software downloader 108 will attempt to use the physical connection 312 in the most efficient manner without blocking other use.

At step 406, based on the best time for establishing communications per the previous step, communications with the server 104 are initiated by the battery charger/software downloader 108. This can be done using any known, or even proprietary, client server protocol suitable for data file transfers. For example, the so-called Transmission Control Protocol/Internet Protocol (TCP/IP) suite implementing the File Transfer Protocol (FTP) can be used. As part of the initiation of communications, the server 104 informs the battery charger/software downloader 108 of the size (e.g., number of bytes of data) of the updated software.

Regardless of the client server protocol used, download session parameters are first determined and sent, at step 408, by the battery charger/software downloader 108 to the server 104. The download session parameters are based on the priority indication, the connection usage profile, and the size of the updated software. In a preferred embodiment, the download session parameters comprise a block size to be used during the session and a number of blocks remaining to be transferred. The block size is directly proportional to the size of the updated software and the priority indication, and inversely proportional to the usage profile (i.e., if the communication with the server 104 occurs during a low-traffic period, then the block size can be bigger; if made during a high-traffic period, then the block size can be smaller). Furthermore, the download session parameters can include session identifiers.

At step 410, blocks of the updated software, which blocks are based on the block size and number of blocks remaining to be transferred discussed above, are received by the battery charger/software downloader 108 from the server 104. As blocks are correctly received, they are acknowledged by the battery charger/software downloader 108 in accordance with well-known client server protocol procedures. Furthermore, at step 412, the correctly received blocks are stored in the memory 306 of the battery charger/software downloader 108. As blocks are received and acknowledged, both the server 104 and the battery charger/software downloader 108 decrement the number of blocks remaining to be transferred.

In this manner, both the server 104 and the battery charger/software downloader 108 can determine when the download is finished.

The process of receiving, acknowledging, and storing blocks continues until, at step 414, it is determined that the download session has concluded. This could occur as a result of all blocks being transferred, as determined by the decrementing of the number of blocks remaining to be transferred.

Alternatively, conclusion of the session could be occur when usage of the physical connection 312 by the battery charger/software downloader 108 is preempted by another device, as determined by the activity detector 310. For example, in the middle of a session, it may be determined that another device, such as a telephone or computer modem, is attempting to access the physical connection 312. In this case, the session is concluded and the download session parameters are updated, at step 416, until such time as the downloading process can begin again.

Updating of the download session parameters, in a preferred embodiment, requires that the number of blocks remaining to be transferred, if greater than zero, be stored. Thus, during initialization of a subsequent session, the stored number of blocks remaining to be transferred from the previous session is sent to the server 104. With knowledge of the size of the original data transfer, the block size, and the remaining number of blocks to be transferred, the data transfer may continue from where it was left off.

At step 418, it is determined if all the necessary blocks were received. If not, another session is initiated at step 406. If so, the blocks of updated software stored in memory 306 are sent to the portable wireless communication unit 101 at step 420. The transfer of the updated software between the battery charger/software downloader 108 and the portable wireless communication unit 101 can be implemented using well-known methods for the transfer of data between processing devices. Once received by the portable wireless communication unit 101, the blocks of updated software are stored in memory 206, thus completing the transfer of the updated software from the server 104 to the portable wireless communication unit 101.

With the present invention, a method and apparatus for downloading updated software to portable wireless communication units. Prior art methods of providing updated software to portable wireless communication units required manual re-programming of the portable or over-the-air downloading of the updated software. Although the over-the-air method is more convenient than the manual method, it typically requires significant use of relatively scarce wireless communication resources. The present invention provides a battery charger/software downloader which essentially takes advantage of the fact that portable wireless communication units need to have their batteries recharged on a regular basis. When recharging is required, the battery charger/software downloader also uses this "downtime" to accomplish downloading of updated software. In using a land-based public communication network to transfer the updated software, as opposed to wireless communication resources, the present invention provides the convenience of over-the-air methods without the intensive use of wireless communication resources.

We claim:

1. A method for an integrated battery charger and software downloader to receive updated software from a server, the method comprising steps of:

coupling a portable wireless communication unit to the integrated battery charger and software downloader;

detecting, in the portable wireless communication unit, a flag that indicates availability of the updated software; and receiving a priority indication from the portable wireless communication unit;

sending to the server, download session parameters to initialize a download session;

receiving, from the server, blocks of the updated software;

storing the blocks of the updated software to produce stored blocks;

updating the download session parameters when the download session has conclude.

2. The method of claim 1, further comprising the step of initiating communication with the server based on the priority indication.

3. The method of claim 2, further comprising initiating communication with the server based on a connection usage profile.

4. The method of claim 3, further comprising initiating communication with the server based on usage costs for a physical connection used by the integrated battery charger and software downloader.

5. The method of claim 1, the step of sending the download session parameters further comprising a step of:
determining the download session parameters based on the priority indication and a connection usage profile.

6. The method of claim 5, the step of sending the download session parameters further comprising sending a block size and a number of blocks remaining to be transferred.

7. The method of claim 1, further comprising a step of sending the stored blocks to the portable wireless communication unit.

8. A method for an integrated battery charger and software downloader to simultaneously charge a battery of a portable wireless communication unit and to download updated software to the portable wireless communication unit, the method comprising the steps of:

coupling the portable wireless communication unit to the integrated battery charger and software downloader;

detecting, by the integrated battery charger and software downloader, a flag, in the portable wireless communication unit, that indicates availability of the updated software;

receiving, by the integrated battery charger and software downloader, a priority indication from the portable wireless communication unit;

initiating, by the integrated battery charger and software downloader, communication with a server via a physical connection to a land-based public communication network;

sending, by the integrated battery charger and software downloader to the server, download session parameters to initialize a download session;

receiving, by the integrated battery charger and software downloader from the server, blocks of the updated software;

storing, by the integrated battery charger and software downloader, the blocks of the updated software to produce stored blocks;

updating, by the integrated battery charger and software downloader, the download session parameters when the download session has concluded; and sending, by the integrated battery charger and software downloader, the stored blocks to the portable wireless communication unit.

9. The method of claim 8, further comprising initiating communication with the server based on the priority indication.

10. The method of claim 9, further comprising initiating communication with the server based on a connection usage profile.

11. The method of claim 10, further comprising initiating communication with the server based on usage costs for a physical connection used by the integrated battery charger and software downloader.

12. The method of claim 8, the step of sending the download session parameters further comprising a step of:
determining the download session parameters based on the priority indication and a connection usage profile.

13. An integrated battery charger and software downloader for use with a portable wireless communication unit comprising:

a unit interface for providing connections to the portable wireless communication unit;

a software downloader comprising:

a processing unit operably coupled to the unit interface for detecting a flag, in the portable wireless communication unit, that indicates availability of updated software and for downloading the updated software to the portable wireless communication unit when the portable wireless communication unit is coupled to the unit interface;

a land-based public communication network interface operably coupled to the processing unit for communicating with a server to receive the updated software; and a memory operably coupled to the processing unit for storing the updated software.

14. The integrated battery charger and software downloader of claim 13, further comprising the battery charger operably coupled to the unit interface.

15. The integrated battery charger and software downloader of claim 14 further comprising an activity detector, operably coupled to the land-based public communication network interface and the processing unit, for detecting activity at an input of the land-based public communication network interface.

* * * * *